United States Patent
Alberts

(10) Patent No.: US 12,297,810 B2
(45) Date of Patent: May 13, 2025

(54) DEVICE AND METHOD FOR CONTROLLING A WIND TURBINE BASED ON A CHANGE ELEMENT

(71) Applicant: Siemens Gamesa Renewable Energy A/S, Brande (DK)

(72) Inventor: Johannes Gerhardes Wardjan Alberts, Brøndby Strand (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 63 days.

(21) Appl. No.: 17/610,883

(22) PCT Filed: Apr. 14, 2020

(86) PCT No.: PCT/EP2020/060386
§ 371 (c)(1),
(2) Date: Nov. 12, 2021

(87) PCT Pub. No.: WO2020/233907
PCT Pub. Date: Nov. 26, 2020

(65) Prior Publication Data
US 2022/0213869 A1  Jul. 7, 2022

(30) Foreign Application Priority Data

May 20, 2019 (EP) .................................... 19175350

(51) Int. Cl.
*F03D 7/02* (2006.01)
*F03D 7/04* (2006.01)

(52) U.S. Cl.
CPC ......... *F03D 7/0224* (2013.01); *F03D 7/0276* (2013.01); *F03D 7/043* (2013.01);
(Continued)

(58) Field of Classification Search
CPC ...... F03D 7/0224; F03D 7/0276; F03D 7/043; F03D 7/044; F03D 7/048
See application file for complete search history.

(56) References Cited

U.S. PATENT DOCUMENTS 4,297,076 A * 10/1981 Donham ............... F03D 7/0276
416/37
10,975,845 B2 * 4/2021 Grunnet .................. F03D 7/045
(Continued)

FOREIGN PATENT DOCUMENTS

| CN | 101749184 A | 6/2010 |
|----|-------------|--------|
| CN | 104295445 A | 1/2015 |

(Continued)

OTHER PUBLICATIONS

Matthew A. Lackner et al: "A comparison of smart rotor control approaches using trailing edge flaps and Individual pitch control", Wind Energy, vol. 13, No. 2-3, Mar. 1, 2010 (Mar. 1, 2010), pp. 117-134, XP055024490, ISSN: 1095-4244, DOI: 10.1002/we.353 Sections 2.3.1 to 2.3.3; figure 1.
(Continued)

*Primary Examiner* — Deming Wan
(74) *Attorney, Agent, or Firm* — Schmeiser, Olsen & Watts, LLP

(57) ABSTRACT

Provided is a control device for controlling a wind turbine, the wind turbine including a rotor and at least one blade being rotatable mounted to the rotor. The control device includes a detecting device being configured to detect an amount of a bending moment of the blade; and a change element having an input and an output, wherein the input is configured to receive the detected amount of the bending moment of the blade and the output is configured to output a response to a differential of the detected amount of the
(Continued)

bending moment of the blade. The control device is configured to control the wind turbine based on the response.

15 Claims, 2 Drawing Sheets

(52) U.S. Cl.
CPC ... *F05B 2270/101* (2013.01); *F05B 2270/322* (2013.01); *F05B 2270/327* (2013.01); *F05B 2270/328* (2013.01); *F05B 2270/331* (2013.01); *F05B 2270/335* (2013.01); *F05B 2270/702* (2013.01)

(56) References Cited

U.S. PATENT DOCUMENTS

| | | | |
|---|---|---|---|
| 2007/0075546 A1 | 4/2007 | Avagliano et al. | |
| 2010/0148507 A1 | 6/2010 | Lim et al. | |
| 2011/0142620 A1* | 6/2011 | Loh | F03D 7/0244 416/30 |
| 2014/0178197 A1* | 6/2014 | Risager | F03D 7/0224 416/31 |
| 2015/0086356 A1* | 3/2015 | Perley | F03D 7/0292 416/1 |
| 2015/0132130 A1* | 5/2015 | Brown | F03D 7/022 416/43 |
| 2015/0275860 A1* | 10/2015 | Carcangiu | F03D 7/044 290/44 |
| 2016/0146189 A1 | 5/2016 | Cook et al. | |
| 2016/0305404 A1 | 10/2016 | Esbensen et al. | |
| 2017/0122289 A1 | 5/2017 | Kristoffersen et al. | |
| 2017/0321654 A1* | 11/2017 | Zheng | F03D 7/028 |
| 2018/0030955 A1* | 2/2018 | Vaddi | F03D 17/00 |
| 2018/0045181 A1 | 2/2018 | Taylor et al. | |

FOREIGN PATENT DOCUMENTS

| | | |
|---|---|---|
| CN | 109072875 A | 12/2018 |
| CN | 109563812 A | 4/2019 |
| EP | 3276164 A2 | 7/2016 |

OTHER PUBLICATIONS

PCT International Search Report & Written Opinion mailed Jul. 13, 2020 corresponding to PCT International Application No. PCT/EP2020/060386.

European Search Report for Application No. 19173508, dated Nov. 1, 2019.

* cited by examiner

DEVICE AND METHOD FOR CONTROLLING A WIND TURBINE BASED ON A CHANGE ELEMENT

CROSS-REFERENCE TO RELATED APPLICATIONS

This application claims priority to PCT Application No. PCT/EP2020/060386, having a filing date of Apr. 14, 2020, which is based off of EP Application No. 19175350.8, having a filing date of May 20, 2019, the entire contents both of which are hereby incorporated by reference.

FIELD OF TECHNOLOGY

The following relates to a control device for controlling a wind turbine, to a wind turbine and to a method of controlling a wind turbine.

BACKGROUND

A conventional wind turbine comprises a tower and a rotor being mounted at the top of the tower to rotate about a rotational axis. The rotor has a plurality of blades which rotate the rotor by use of wind energy. The conventional wind turbine comprises a control device which is configured to maintain a fixed rotational speed of the rotor by varying both an output power of the wind turbine and a blade pitch angle. A speed-power controller and a speed-pitch controller are main controllers that make sure the nominal speed of the rotor is kept within acceptable boundaries.

In some severe cases of a wind gust or a sudden wind direction change, the conventional speed control is too slow to maintain the rotor speed within the acceptable boundaries, and at the same time too slow to prevent a high thrust on the wind turbine, which can create high loads on the blades and the tower. The reasons of the slow controlling speed are the conventional controllers itself, which are usually PI controllers. It is up to now difficult to use change elements in the conventional controllers because the speed sensors are too noisy to be able to use its derivate, which in turn amplifies the noise. As a result, the conventional speed sensors are not suitable for a derivative control.

Furthermore, the conventional controllers are too slow for severe gust cases. As a result, high loads on many structural components of the wind turbine can occur such as extreme blade flap bending, extreme tower bending and extreme tower torsion.

Eventually, a shutdown of the turbine can occur. When a severe gust travels through an offshore wind park and creates an overspeed due to the relative slow PI controllers, it will potentially shut down a large number of turbines in a single site.

The loading problem has up to now been solved by improving the structural capacities of the blades and tower and by accepting that shutdowns may occur during severe gusts. However, efforts in improving the structural capacity increase the costs.

SUMMARY

An aspect relates to provide a control device for controlling a wind turbine, a wind turbine and a method of controlling a wind turbine, which can reduce loads on the blades or the tower occurring during severe wind gusts.

According to a first aspect of embodiments of the invention, a control device for controlling a wind turbine is provided, wherein the wind turbine comprises a rotor and at least one blade being rotatable mounted to the rotor. The control device comprises a detecting device being configured to detect an amount of a bending moment of the blade and a change element having an input and an output, wherein the input is configured to receive the detected amount of the bending moment of the blade and the output is configured to output a response to a differential of the detected amount of the bending moment of the blade. The control device is configured to control the wind turbine based on the response.

The differential can be a change of speed (i.e., an acceleration) that allows the turbine to detect the change in speed, for example of a bending moment. Alternatively, the differential can be the change of the bending moment, or the change of the bending moment can be interpreted as the change of speed. The change occurs in a predetermined time interval. In the context of this disclosure, the term change element" means an element which considers such a change in the detected amount of the bending moment.

The change element can be a so-called derivative element, and the response can be a so called step response of the derivative element.

When the wind strength is increasing, the blades will bend before the rotor speed will increase. When the wind strength is decreasing, the blades will unbend before the rotor speed drops. Therefore, the detection of the amount of the bending moment of the blade has a natural phase lead over speed changes. The rotor speed can be seen as the integral of the blade deflection, and vice versa the blade deflection can be seen as the derivative of the speed error. Since the purpose is to react to changing wind conditions, the derivative (or a difference between two time instances of the bending moment, or a difference between two filtered values (with different time constants) of the bending moment) is taken of the measured amount of the bending moment of the blade, which indicates if the wind is increasing or decreasing. The derivative of the control device gives a lead on the speed increase corresponding to a double derivative of the speed error, but with a noise level smaller than a single derivative of the speed error.

Advantageously, loads on the blades or the tower occurring during severe wind gusts can be reduced with an excellent response behavior due to the phase lead of the derivative/change element, and shut offs of the wind turbine can be avoided.

The control device and/or the change element according to embodiments of the present invention can be implemented by using software, hardware, firmware, or a combination thereof in accordance with the embodiments described herein.

The control device and/or the change element can be implemented in a software algorithm, in particular to calculate the response of the change element, for example by use of a predetermined transfer function. The algorithm is implemented in one or more computer programs including computer readable instructions to be executed on the control device. Each computer program can be a set of instructions (program code) in a code module resident in a memory of the control device. Until required by the control device, the set of computer readable instructions may be stored in another computer memory (e.g., in a hard disk drive, or in a removable memory such as an optical disk, external hard drive, memory card, or flash drive) or stored on another computer system and downloaded via the Internet or other network. A computer program for carrying out the algorithm can be written in any combination of one or more programming languages, including an object-oriented programming language such as Java, Smalltalk, C++ or the like and conventional procedural programming languages, such as the "C" programming language or similar programming languages. The program code can be executed entirely on the control device of the wind turbine, partly on the control device of the wind turbine, or as a stand-alone software package.

The memory such as a Random-Access-Memory (RAM) can be provided in which the computer readable instructions for executing the algorithm for implementing the control device and/or change element of embodiments of the present invention are stored. Any combination of one or more memories as computer readable storage medium(s) can be utilized. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of embodiments of the present invention, a computer readable storage medium can be any tangible medium that can contain or store a program for use by or in connection with an instruction execution system, apparatus, or device.

At least one processor can be coupled to the memory and the detecting device. At least one processor can be configured to execute the stored computer readable instructions of the algorithm for implementing the control device and/or the change element of embodiments of the present invention. At least one processor is an example of the control device. The processor can be a general purpose computer, a special purpose computer, or any other programmable data processing apparatus to produce a machine, such that the computer readable instructions, which are executed via the processor of the computer or other programmable data processing apparatus, create means for implementing the functions/acts as specified in this disclosure.

Further, disclosed implementations may not be limited to any specific combination of hardware. Further, certain portions of embodiments of the invention may be implemented as "logic" that performs one or more functions. This logic may include hardware, such as hardwired logic, an application-specific integrated circuit, a field programmable gate array, a microprocessor, or a combination of hardware and software.

Further, the phrase "based on," as used herein is intended to mean "based, at least in part, on" unless explicitly stated otherwise.

In an embodiment, the control device is configured to control a rotational speed of the rotor by altering a pitch angle of the blade and/or by altering an output power of the wind turbine based on the response.

In an embodiment, the control device is configured to increase the rotational speed of the rotor when the response is positive, for example when the bending moment increases, and/or to decrease the rotational speed of the rotor when the response is negative, for example when the bending moment decreases.

In an embodiment, the control device is configured to modify a speed control of the rotor by increasing a torque reference, a power reference and/or a pitch reference (for example towards a stop of operation) when the response is positive, for example when the bending moment increases, and/or by decreasing the torque reference, the power reference and/or the pitch reference (towards the operation) when the response is negative, for example when the bending moment decreases. The torque reference, the power reference and/or the pitch reference can be target values of a rotor torque, a wind turbine power and a pitch angle of the blade.

First, the response behavior of the rotor speed control (which is based for example on a conventional and relative slow PI control) is remarkably improved by directly modifying a reference variable, which for example can alter the rotor speed, by means of the control device which comprises the relative fast change element. Second, as the change element for the bending moment of the blade is less prone to noise, an improved response behavior of the rotor speed control can also be achieved if the target value of the rotor speed is directly modified by means of the control device.

In an embodiment, the control device further comprises a low-pass filter connected before the input or behind the output of the change element, wherein the control device is configured to control the wind turbine based on the filtered change in the bending moment. The filter can be an adaptive band stop filter, in particular an adaptive 3P band stop filter which filters 1P contributions in the signals which are added up to a combined 3P disturbance. Also, other several harmonic disturbances can be filtered out, like 3P, 6P and 9P disturbances.

In an embodiment, the bending moment of the blade is a root moment of the blade or any other estimate of the bending moment. For example, large offshore wind turbines usually have preinstalled blade root sensors that measure strain on the blade, which is transferred into a bending moment. Advantageously, such wind turbines can readily equipped or retrofitted with the control device according to embodiments of the present invention.

In an embodiment, the wind turbine comprises a plurality of blades, wherein the control device is configured to add up the detected amounts of the bending moment of the blades to obtain a first sum, and to input the first sum in the input of the change element. For example, a wind turbine may have three blades, and each of the blades may have its own detecting device. Three channels of the three detecting devices can be combined into one single representation of the change in wind direction or the change in wind speed.

In an embodiment, the wind turbine comprises a plurality of blades, wherein the control device is configured to control the wind turbine based on the response of the bending moment of that blade which is currently pointing up. The blade which is currently pointing up is usually subjected to the highest loads.

According to a second aspect of embodiments of the invention, a wind turbine comprises a tower, a rotor, the rotor being mounted at the top of the tower to rotate about a rotational axis, wherein the rotor has a plurality of blades, and the above-mentioned control device.

According to a third aspect of embodiments of the invention, a method of controlling a wind turbine is provided, wherein the wind turbine comprises a rotor and at least one blade being rotatable mounted to the rotor. The method comprises detecting an amount of a bending moment of the blade; providing a change element having an input and an output; inputting the detected amount of the bending moment of the blade in the input of the change element;

outputting a response from the output of the change element; and controlling the wind turbine based on the output response.

In an embodiment, a rotational speed of the rotor is controlled by altering a pitch angle of the blade and/or by altering an output power of the wind turbine based on the response.

In an embodiment, the rotational speed of the rotor is increased when the response is positive, and/or to the rotational speed of the rotor is decreased when the response is negative. The response is positive for example when the bending moment increases, and the response is negative for example when the bending moment decreases.

In the method of controlling a wind turbine, the change element can be provided in a software algorithm. In particular, the change element can be implemented in a software algorithm to calculate the response, for example by use of a predetermined transfer function which represents the response. A memory can be provided in which computer readable instructions for executing the algorithm for implementing the change element of embodiments of the present invention are stored. A processor can be coupled to the memory and the detecting device. The processor can be configured to execute the stored instructions according to the algorithm for implementing the change element of embodiments of the present invention. The processor can be configured to control the wind turbine.

BRIEF DESCRIPTION

Some of the embodiments will be described in detail, with reference to the following figures, wherein like designations denote like members, wherein.

Figure 3:
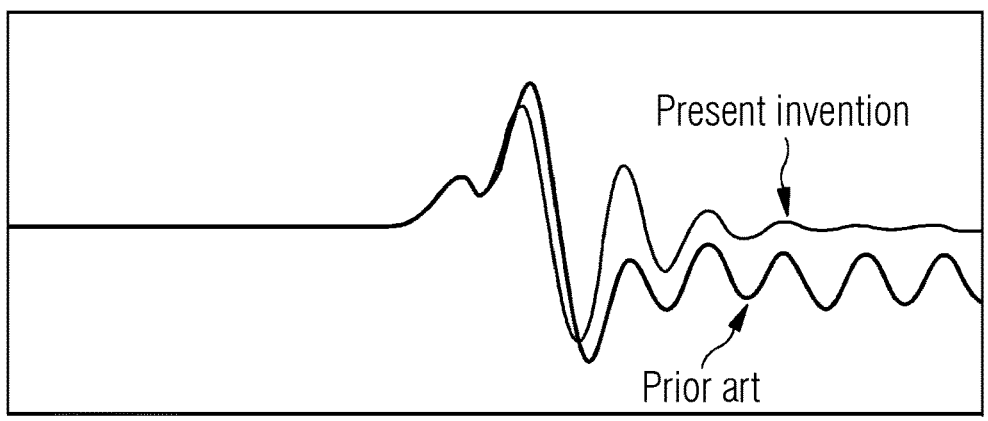
Figure 4:
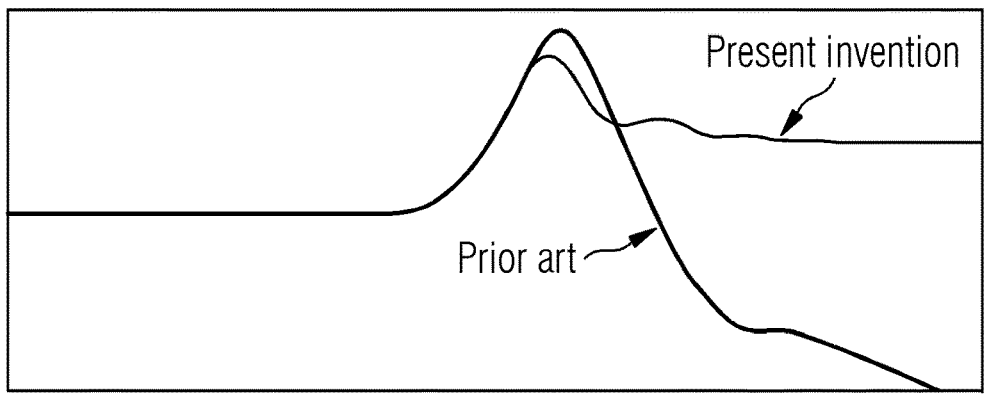

FIG. 3 shows a time chart of a tower bending moment achieved by a control device according to an embodiment of the present invention compared with a time chart of a tower bending moment achieved by a conventional control device; and FIG. 4 shows a time chart of a rotor speed achieved by a control device according to an embodiment of the present invention compared with a time chart of a rotor speed achieved by a conventional control device.

DETAILED DESCRIPTION

The illustrations in the drawings are schematically. It is noted that in different figures, similar or identical elements are provided with the same reference signs.

Figure 1:
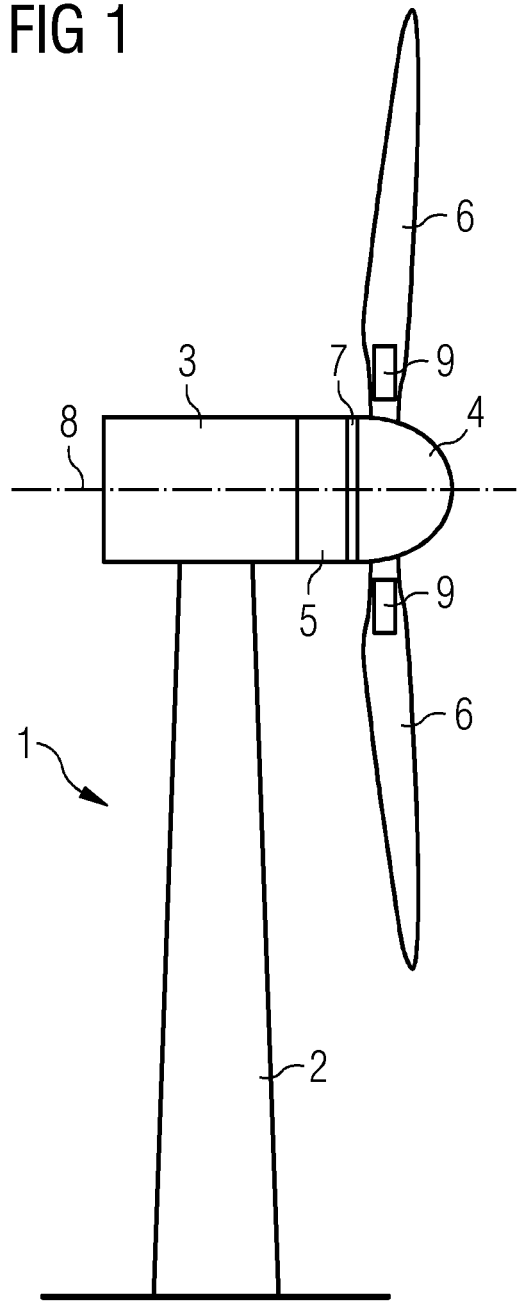
FIG. 1 shows a wind turbine in which a control device according to an embodiment of the present invention can be incorporated.

FIG. 1 shows a wind turbine 1. The wind turbine 1 comprises a nacelle 3 and a tower 2. The nacelle 3 is mounted at the top of the tower 2. The nacelle 3 is mounted rotatable with regard to the tower 2 by means of a yaw bearing. The axis of rotation of the nacelle 3 with regard to the tower 2 is referred to as the yaw axis.

The wind turbine 1 also comprises a hub 4 with three rotor blades 6 (of which two rotor blades 6 are depicted in FIG. 1). The hub 4 is mounted rotatable with regard to the nacelle 3 by means of a main bearing 7. The hub 4 is mounted rotatable about a rotor axis of rotation 8.

The wind turbine 1 furthermore comprises a generator 5. The generator 5 in turn comprises a rotor 10 connecting the generator 5 with the hub 4. The hub 4 is connected directly to the generator 5, thus the wind turbine 1 is referred to as a gearless, direct-driven wind turbine. Such a generator 5 is referred as direct drive generator 5. As an alternative, the hub 4 may also be connected to the generator 5 via a gear box. This type of wind turbine 1 is referred to as a geared wind turbine. Embodiments of the present invention is suitable for both types of wind turbines 1.

The generator 5 is accommodated within the nacelle 3. The generator 5 is arranged and prepared for converting the rotational energy from the hub 4 into electrical energy in the shape of an AC power.

The wind turbine 1 comprises a control device (not shown) for controlling the wind turbine 1. The control device comprises a detecting device 9 being configured to detect an amount of a bending moment of the blade 6. The bending moment of the blade 6 is a root moment of the blade 6 in this embodiment.

The control device further comprises a change element (not shown) having an input and an output, wherein the input is configured to receive the detected amount of the bending moment of the blade 6, and the output is configured to output a response to a differential of the detected amount of the bending moment of the blade 6. The differential can be a change of speed (i.e., an acceleration) that allows the turbine to detect the change in speed, for example of a bending moment. Alternatively, the differential can be the change of the bending moment, or the change of the bending moment can be interpreted as the change of speed. The change occurs in a predetermined time inter-val. The differential can also be a speed of a change, for example a ratio between a change amount and a time interval, of the detected amount of the bending moment of the blade 6. The change element can also be a so-called derivative element, and the response can be a so called step response of the derivative element. The control device is configured to control the wind turbine 1 based on the response.

In detail, the control device is configured to control a rotational speed of the rotor 3 by altering a pitch angle of the blade 6 and/or by altering an output power of the wind turbine 1 based on the response. The control device is configured to increase the rotational speed of the rotor 3 when the response is positive, for example when the bending moment increases, and/or to decrease the rotational speed of the rotor 3 when the response is negative, for example when the bending moment decreases.

It is possible that the control device is configured to modify a speed control of the rotor by increasing a torque reference, a power reference and/or a pitch reference (for example towards a stop of operation) when the response is positive, for example when the bending moment increases, and/or by decreasing the torque reference, the power reference and/or the pitch reference (towards the operation) when the response is negative, for example when the bending moment decreases. The torque reference, the power reference and/or the pitch reference can be target values of a rotor torque, a wind turbine power and a pitch angle of the blade.

The control device further comprises a low-pass filter (not shown) connected before the input or behind the output of the change element, wherein the control device is configured to control the wind turbine 1 based on the filtered change in the bending moment. The filter can be an adaptive band stop filter, in particular an adaptive 3P band stop filter which filters 1P contributions in the signals which are added up to a combined 3P disturbance.

Since the wind turbine 1 comprises three blades 6, the control device is configured to add up the three detected amounts of the bending moment of the three blades 6 to obtain a first sum, and to input the first sum in the input of the change element.

Alternatively, it is possible that the control device is configured to add up the three responses of the three blades 6 to obtain a second sum, to input the second sum in a low pass filter, and to control the wind turbine 1 based on a signal output from the low pass filter.

Further alternatively, it is possible that the control device is configured to control the wind turbine 1 based on the response of the bending moment of that blade 6 which is currently pointing up.

Figure 2:
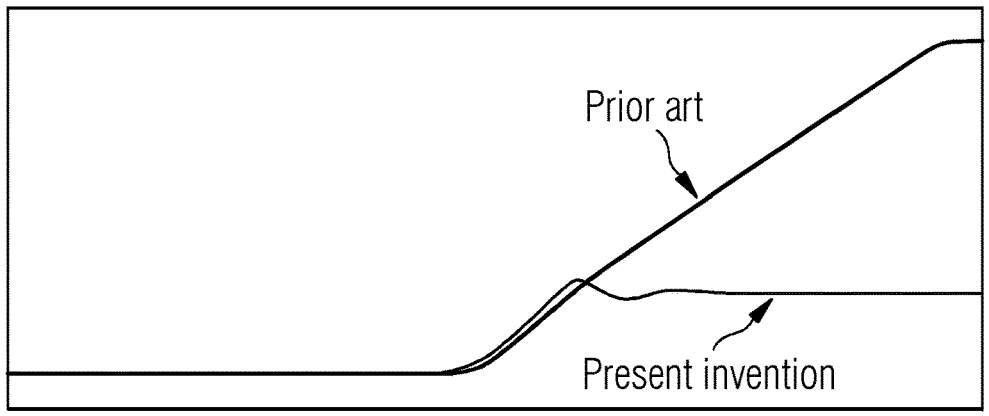
FIG. 2 shows a time chart of a blade pitch angle achieved by a control device according to an embodiment of the present invention compared with a time chart of a blade pitch angle achieved by a conventional control device.

FIG. 2 shows a time chart of a blade pitch angle achieved by a control device according to an embodiment of the present invention compared with a time chart of a blade pitch angle achieved by a conventional control device. The upper chart represents the time chart of the blade pitch angle achieved by the control device according to an embodiment of the present invention, and the lower chart a time chart of a blade pitch angle achieved by a conventional control device without any change element. The response of the upper chart starts a few seconds earlier than the lower chart and has a significant improvement with regards to the loads and the operation of the wind turbine 1. It can be seen that the wind turbine 1 according to the embodiment of the present invention stays in operation after this severe gust.

FIG. 3 shows a time chart of a tower bending moment achieved by a control device according to an embodiment of the present invention compared with a time chart of a tower bending moment achieved by a conventional control device. The tower bending moment is measured at the bottom of the tower 2. In this example, it can be seen that both tower bottom maximum positive loads and (absolute) maximum negative loads are reduced in the embodiment of the present invention.

FIG. 4 shows a time chart of a rotor speed achieved by a control device according to an embodiment of the present invention compared with a time chart of a rotor speed achieved by a conventional control device. It can be seen that the wind turbine 1 according to embodiments of the present invention stays on grid.

Computer simulations based on a wind turbine 1 according to embodiments of the present invention revealed the following benefits.

Second, by detecting the gust earlier compared with the conventional art, the wind turbine 1 can pitch out earlier and thus limit the maximum speed to rotor experiences. Instead of having an overspeed and a turbine shutdown, the wind turbine 1 of embodiments of the present invention can continue operation after severe wind fronts and wind gusts, which results to a higher grid stability by guaranteeing that entire sites can endure extreme events.

Embodiment of the present invention can use blade root sensors 9 to predict high rotor speed situations where the wind turbine 1 is at risk to shut down because of overspeed. This obtains a phase lead of a double derivative, but in a signal quality which is better than a single derivative (double derivatives typically contain too much noise when it comes to signal quality).

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A control device for controlling a wind turbine, the wind turbine comprising a rotor and at least one blade being rotatable mounted to the rotor, the control device comprising:
   a detecting device configured to detect an amount of a bending moment of the blade; and
   a change element having an input and an output, wherein the input is configured to receive the detected amount of the bending moment of the blade and the output is configured to output a response to a differential of the detected amount of the bending moment of the blade;
   wherein the control device is configured to control the wind turbine using a response behaviour based on the response,
   wherein the response behaviour is based directly on a derivative element that provides a phase lead over changes in rotor speed, and
   wherein the control device is configured to modify a speed control of the rotor by increasing a torque reference, a power reference and/or a pitch reference when the response is positive, and by decreasing the torque reference, the power reference and/or the pitch reference when the response is negative.

2. The control device according to claim 1, wherein the control device is configured to control a rotational speed of the rotor by altering a pitch angle of the blade and/or by altering an output power of the wind turbine based on the response.

3. The control device according to claim 1, further comprising:
   a low-pass filter connected before the input or behind the output of the change element, wherein the control device is configured to control the wind turbine based on the filtered change in the bending moment.

4. The control device according to claim 1, wherein the bending moment of the blade is a root moment of the blade or any other estimate of the bending moment.

5. The control device according to claim 1, wherein the wind turbine comprises a plurality of blades, wherein the control device is configured to add up the detected amounts of the bending moment of the blades to obtain a first sum, and to input the first sum in the input of the change element.

6. The control device according to claim 1, wherein the wind turbine comprises a plurality of blades, wherein the control device is configured to control the wind turbine based on the response of the bending moment of that blade which is currently pointing up.

7. The method according to claim 1, wherein a rotational speed of the rotor is controlled by altering a pitch angle of the blade and/or by altering an output power of the wind turbine based on the response.

8. The control device according to claim 1, wherein the response behaviour allows for pre-emptive adjustments.

9. The control device according to claim 1, wherein the control device is configured to increase the rotational speed of the rotor when the response is negative, and/or to decrease the rotational speed of the rotor when the response is positive.

10. A wind turbine comprising:
    a tower;

a rotor, the rotor being mounted at the top of the tower to rotate about a rotational axis, wherein the rotor has a plurality of blades; and a control device including a detecting device configured to detect an amount of a bending moment of the blade and a change element having an input and an output, wherein the input is configured to receive the detected amount of the bending moment of the blade and the output is configured to output a response to a differential of the detected amount of the bending moment of the blade, wherein the control device is configured to control the wind turbine using a response behaviour based on the response, wherein the response behaviour is based directly on a derivative element that provides a phase lead over changes in rotor speed, and wherein the control device is configured to modify a speed control of the rotor by increasing a torque reference, a power reference and/or a pitch reference when the response is positive, and by decreasing the torque reference, the power reference and/or the pitch reference when the response is negative.

11. The wind turbine according to claim 10, wherein the response behaviour allows for pre-emptive adjustments.

12. The wind turbine according to claim 10, wherein the control device is configured to increase the rotational speed of the rotor when the response is negative, and/or to decrease the rotational speed of the rotor when the response is positive.

13. A method of controlling a wind turbine, the wind turbine comprising a rotor and at least one blade being rotatable mounted to the rotor, the method comprising steps of:

detecting an amount of a bending moment of the blade;

providing a change element having an input and an output;

inputting the detected amount of the bending moment of the blade in the input of the change element;

outputting a response from the output of the change element; and controlling the wind turbine using a response behaviour based on the output response, wherein the response behaviour is based directly on a derivative element that provides a phase lead over changes in rotor speed, wherein the control device is configured to modify a speed control of the rotor by increasing a torque reference, a power reference and/or a pitch reference when the response is positive, and by decreasing the torque reference, the power reference and/or the pitch reference when the response is negative.

14. The method according to claim 13, wherein the response behaviour allows for pre-emptive adjustments.

15. The method according to claim 13, wherein the control device is configured to increase the rotational speed of the rotor when the response is negative, and/or to decrease the rotational speed of the rotor when the response is positive.

\* \* \* \* \*